United States Patent [19]
York

[11] Patent Number: 5,361,011
[45] Date of Patent: Nov. 1, 1994

[54] MECHANICALLY INTERLOCKING ROTOR ASSEMBLY

[75] Inventor: Michael T. York, Whitmore Lake, Mich.

[73] Assignee: Ford Motor Company, Dearborn, Mich.

[21] Appl. No.: 161,561

[22] Filed: Dec. 6, 1993

[51] Int. Cl.$^5$ .............................................. H02K 3/32
[52] U.S. Cl. ...................................... 310/194; 310/45; 310/208; 310/261; 310/263
[58] Field of Search ................. 310/263, 194, 214, 42, 310/45, 261, 91, 208; 336/185, 208

[56] References Cited

U.S. PATENT DOCUMENTS

| | | |
|---|---|---|
| 2,588,175 | 3/1952 | Stewart et al. |
| 3,252,025 | 5/1966 | Brown ............................ 310/263 |
| 3,305,740 | 2/1967 | Shano . |
| 3,603,825 | 9/1971 | Sheridan ......................... 310/263 |
| 4,114,056 | 9/1978 | Nimura . |
| 4,307,314 | 12/1981 | Yamada et al. |
| 4,588,915 | 5/1986 | Gold et al. |
| 4,614,889 | 9/1986 | Ikegami et al. |
| 4,639,628 | 1/1987 | Kobayashi et al. |
| 4,987,331 | 1/1991 | Horng . |
| 5,233,255 | 8/1993 | Kusumoto ....................... 310/263 |

FOREIGN PATENT DOCUMENTS 1364072  5/1964  France ..................... 310/263

*Primary Examiner*—R. Skudy
*Attorney, Agent, or Firm*—Mark S. Sparschu; Roger L. May

[57] ABSTRACT

A rotor for an electrical machine comprises a bobbin, a winding, and two pole pieces. The winding comprises a wire wound around the outer surface of the bobbin. At least one flat on the outer surface of the bobbin is imparted on the winding, mechanically locking the winding to the bobbin. The bobbin is concentrically disposed over hubs on the two pole pieces, the bobbin and the hubs having complementary flats which only allow assembly of the bobbin and the hubs when the flats are aligned. A method for producing a rotor comprises providing a bobbin with at least one flat on its outer surface and at least one flat on its inner surface; winding wire around the outer surface of the bobbin to create a winding with at least one flat in it; providing two pole pieces with hubs with complementary flats to the at least one flat on the inner surface of the bobbin; aligning the flats on the hubs and on the inner surface of the bobbin; and inserting the hubs into the bobbin.

8 Claims, 2 Drawing Sheets

MECHANICALLY INTERLOCKING ROTOR ASSEMBLY

BACKGROUND OF THE INVENTION

1. Field of the Invention

This invention relates to a rotor for an electrical machine.

2. Description of the Related Art

Electrical machines (generators and motors) typically contain a rotating member called a rotor. Referring to FIG. 1, a rotor typically is comprised of pole pieces 11 and an electric coil assembly 12. Pole pieces 11 illustrated in FIG. 1 are from a "claw pole" rotor, a typical rotor found in alternators used in automobiles. Coil assembly 12 comprises wire wound around a bobbin. Typically, when the machine is operating, the wire is energized to create a magnetic field. The magnetic field in turn magnetizes pole pieces 11, creating magnetic poles at the claws of pole pieces 11. Those magnetic poles then play their part, as is well-known in the art, when the alternator generates electrical power.

Because a rotor in an electrical machine rotates, coil assembly 12 needs to be affixed to pole pieces 11 to assure that coil assembly 12 rotates along with pole pieces 11 in the rotor. Furthermore, the wire of coil assembly 12 must be affixed to the bobbin, to assure that the wire does not rotate or otherwise move with respect to the bobbin. Relative movement between the wire and the bobbin as the rotor rotates can cause premature failure of the wire.

A typical way of affixing coil assembly 12 to pole pieces 11 is through the use of an adhesive such as epoxy. The adhesive holds coil assembly 12 to pole pieces 11. One typical way of bonding the wire of coil assembly 12 to the bobbin is through the use of varnish applied to the wire after it is wound on the bobbin. However, because varnish does not stick well to typical bobbins, varnish alone provides only marginal adhesion. A second way of bonding the wire of coil assembly 12 to the bobbin is through adhesive-impregnated tape wrapped on the bobbin before the wire is wound, or on the coil after the wire is wound. The coil is then typically heated to melt the adhesive on the tape. However, the coating of some of the wires of the coil assembly is often less than perfect when such tape is used. Relative movement of some of the wires, and a consequent decrease in durability of the alternator, can then result. A third way of bonding the wire of coil assembly 12 to the bobbin is through holes in the side walls of the bobbin. When the bobbin is adhesively bonded to the pole pieces 11, some of the adhesive flows through the holes, bonding the wire to itself and to the bobbin.

Although adhesives are often effective in affixing the various parts described herein, there are some disadvantages to the use of such adhesives. The processes by which the adhesives are applied add complexity to the manufacture of an alternator. The processes further often require expensive equipment. Additionally, some of the aforementioned methods of adhesively bonding wires to the bobbin do not provide bonding with very high reliability.

U.S. Pat. Nos. 3,305,740 and 4,307,314 provide non-adhesive ways to hold a coil assembly to a pole piece. However, neither of those patents addresses the issue of affixing coil wire to a bobbin in other than the prior-art ways of doing so. Furthermore, the ways provided by those patents to hold a coil assembly to a pole piece are relatively difficult to manufacture.

Therefore, an invention which provides easy-to-manufacture means for affixing a coil assembly to pole pieces without adhesives and which provides means for affixing coil wire to a bobbin with high reliability and with reduced dependence on adhesives will provide an advantage over the prior art.

SUMMARY OF THE INVENTION

The present invention provides a rotor for an electrical machine, the rotor comprising a pole piece which is generally cylindrical and which has an axis of rotation perpendicular to the center of the pole piece. The pole piece further has a generally cylindrical hub concentric with the axis of rotation of the pole piece. The rotor further comprises a generally annular bobbin with an inner surface and an outer surface. The inner surface has a diameter such that the hub of the pole piece can be inserted concentrically into the bobbin. The outer surface of the bobbin has at least one flat portion. The rotor further comprises windings which comprise wire wound around the outer surface of the bobbin. The windings acquire at least one flat portion, the number and location of flat portions being the same as those of the at least one flat portion on the outer surface of the bobbin.

The present invention also provides a method for producing a rotor for an electrical machine. The method comprises, first, the step of providing a generally cylindrical pole piece with an axis of rotation at the center of the pole piece. The pole piece further comprises a generally cylindrical hub concentric with the axis of rotation. The method for producing a rotor further comprises the step of providing a generally annular bobbin with an inner surface and an outer surface. The inner surface has a diameter such that the hub of the pole piece can be inserted concentrically into the bobbin. The outer surface has at least one flat portion. The method further comprises the step of winding wire about the bobbin, creating windings with flat portions corresponding in number and location to the at least one flat portion on the outer surface of the bobbin. Finally, the method comprises the step of concentrically inserting the hub of the pole piece into the bobbin.

Another embodiment of the present invention further provides another rotor for an electrical machine. The rotor has a pole piece, the pole piece being generally cylindrical and having an axis of rotation perpendicular to the center of the pole piece. The pole piece further has a generally cylindrical hub concentric with the axis of rotation. The hub of the pole piece has an external surface, the external surface having at least one flat portion located on the external surface and running axially. The rotor further has a bobbin, the bobbin being generally annular in shape and having an inner surface and an outer surface. The inner surface has a diameter and has at least one flat portion located on the inner surface and running axially. The diameter and the at least one flat portion are such that the bobbin can be placed concentrically onto the hub, but only if the at least one flat surface of the hub and the at least one flat surface on the inner surface of the bobbin are aligned. The bobbin is located concentrically on the hub of the pole piece.

The present invention provides advantages over the prior art. First, improved resistance to relative movement between the coil wires and the bobbin is achieved, and it is achieved without dependence on adhesive to provide the resistance. Furthermore, the need for adhesive to bond the coil assembly to the pole pieces is replaced by a mechanical bonding method which is easy to manufacture. The overall result gained by the use of the present invention is a rotor with improved reliability and reduced requirement for adhesive. The reduced requirement for adhesive means that the complexity of manufacture and the need for expensive machinery to apply adhesive in the manufacture of rotors are reduced.

DETAILED DESCRIPTION OF THE PREFERRED EMBODIMENT

Figure 1:
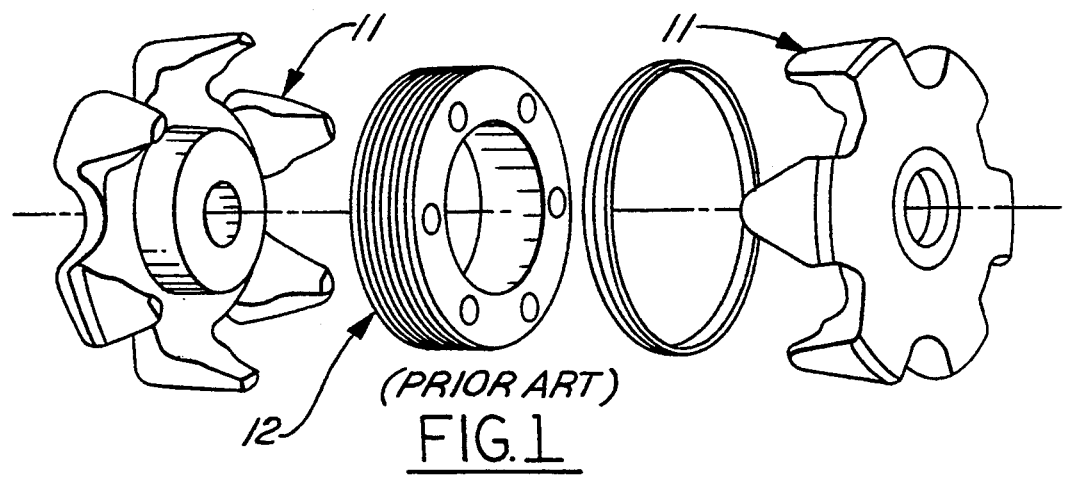
FIG. 1 is an exploded view showing a portion of a rotor of the prior art.
Figure 2:
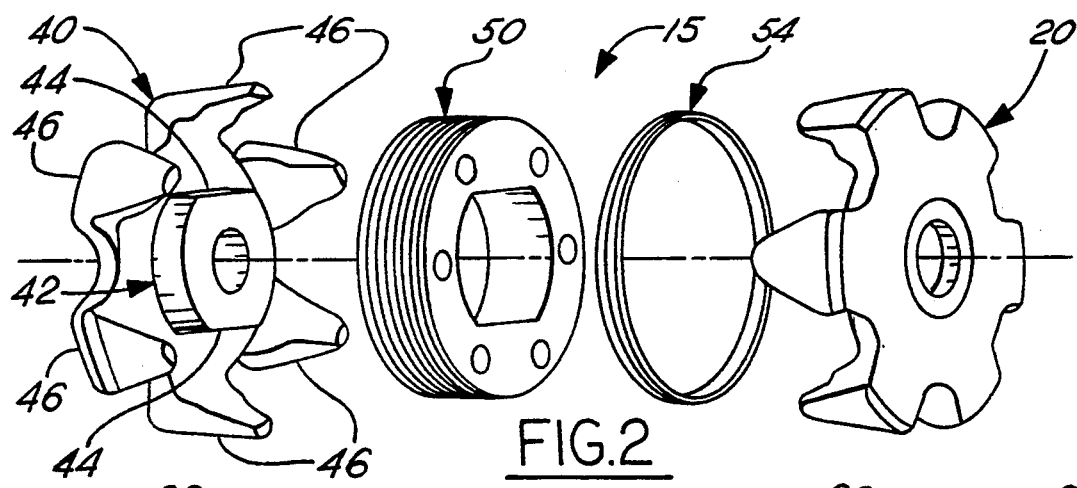
FIG. 2 is an exploded view showing a portion of the rotor of the preferred embodiment of the present invention.

Referring to FIG. 2, rotor 15 of the preferred embodiment of the present invention comprises a first pole piece 20 and a second pole piece 40. Rotor 15 further comprises a coil assembly 50. Also, rotor 15 comprises a noise ring 54. Noise ring 54 is an aluminum ring typically used in the art in order to reduce acoustic noise generated by the rotation of rotor 15. Noise ring 54 has a diameter such that it slips over coil assembly 50.

Figure 3:
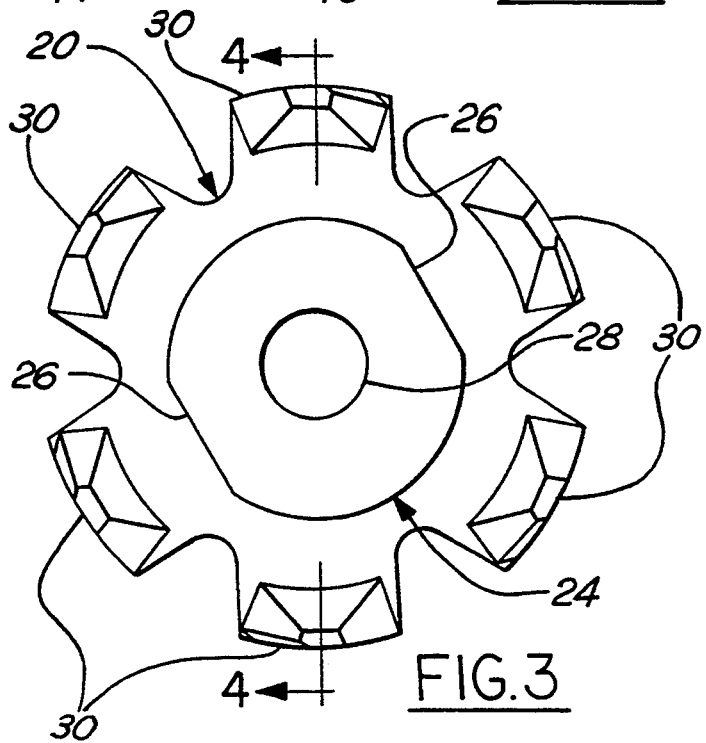
FIG. 3 is a front view of one pole piece depicted in FIG. 2.
Figure 4:
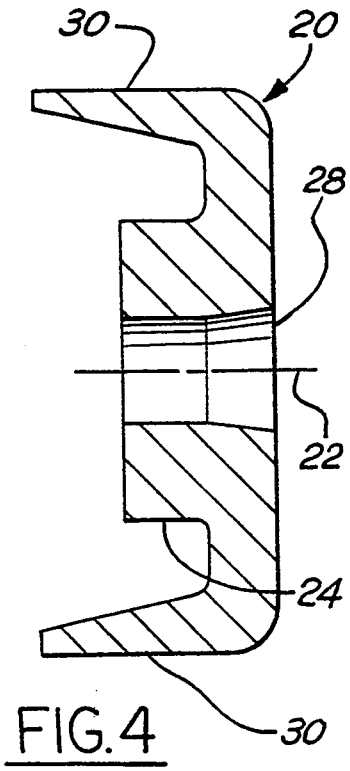
FIG. 4 is side view of the pole piece of FIG. 3.

Referring to FIGS. 3 and 4, first pole piece 20 will be described in detail. First pole piece 20 is generally cylindrical, as shown in FIG. 3. At the center of pole piece 20 is an axis of rotation 22. A hub 24, generally cylindrical in shape, is located concentrically with axis of rotation 22. Hub 24 comprises two flats 26. In the center of hub 24 is a hole 28, through which a shaft (not shown) on which rotor 15 is mounted can pass. First pole piece 20 further comprises a plurality of claws 30 located around the circumference of first pole piece 20.

Referring to FIG. 2, second pole piece 40 is of very similar construction to first pole piece 20. Second pole piece 40 has a hub 42 with two flats 44. Second pole piece 40 also has claws 46 similar to claws 30 on first pole piece 20. However, claws 46 of second pole piece 40 are disposed such that with claws 30 of first pole piece 20 pointing toward claws 46 of second pole piece 40 (the orientation shown in FIG. 2) and with flats 26 of first pole piece 20 aligned with flats 44 of second pole piece 40, claws 30 of first pole piece 20 and claws 46 of second pole piece 40 mesh if first pole piece 20 and second pole piece 40 are brought together.

Figure 5:
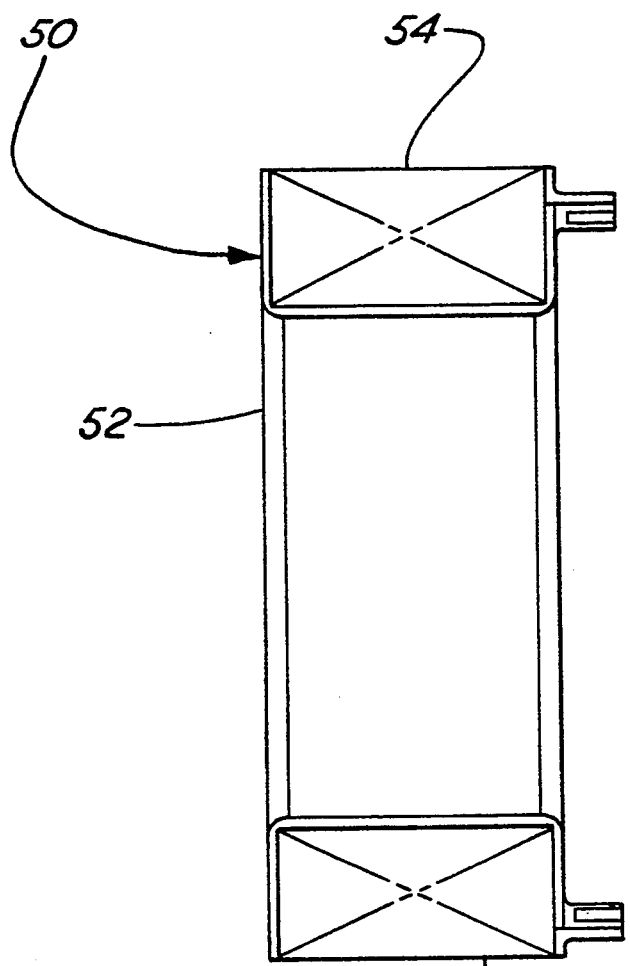
FIG. 5 is a sectional side view of the coil assembly depicted in FIG. 2.
Figure 6:
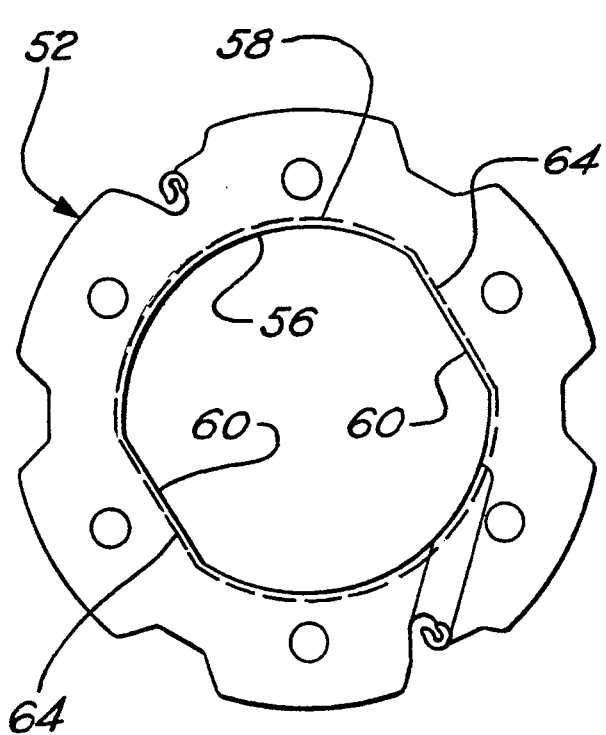
FIG. 6 is a front view of the bobbin of the coil assembly depicted in FIGS. 2 and 5.
Figure 7:
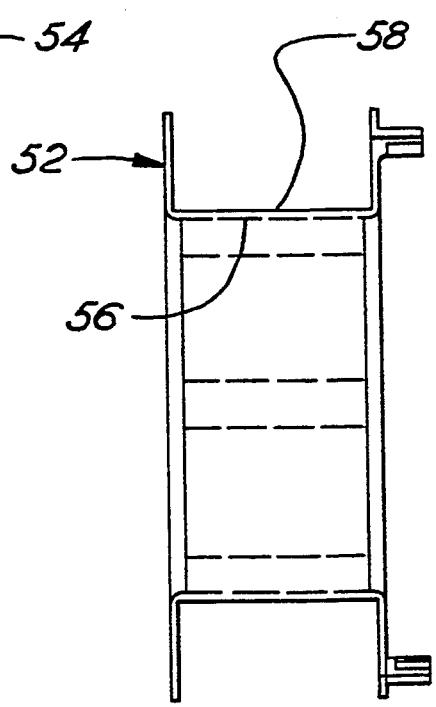
FIG. 7 is a side view of the bobbin of FIG. 6.

Referring to FIG. 5, coil assembly 50 will be described in detail. Coil assembly 50 comprises bobbin 52 and windings 54. Bobbin 52 is an injection-molded plastic part. Referring now to FIGS. 6 and 7, bobbin 52 comprises an inner surface 56 and an outer surface 58. Inner surface 56 comprises flats 60. The diameter of inner surface 56 and the size and location of flats 60 are such as to allow hub 24 (FIG. 3) of first pole piece 20 and hub 42 (FIG. 2) of second pole piece 40 to be slip- or press-fit inside bobbin 52. However, hubs 24 and 42 can be slip-or press-fit inside bobbin 52 only if flats 26 of hub 24 and flats 44 of hub 42 are aligned with flats 60.

Coil assembly 50 further comprises windings 54. Windings 54 comprise a continuous length of wire wound around bobbin 52. Outer surface 58 of bobbin 52 comprises flats 64. When wound around bobbin 52, windings 54 take the shape of outer surface 58 of bobbin 52. This shape includes flats imparted by flats 64. Flats 64, along with the flats they impart in windings 54, help fix windings 54 to bobbin 52, preventing relative motion between windings 54 and bobbin 52 as rotor 15 rotates.

In the preferred embodiment of the present invention, windings 54 are composed of traditional wire used in windings of electrical machines. This wire simply has a conductor surrounded by insulation. After the wire is wound to form windings 54, a coating of varnish is applied to windings 54. The result is a highly reliable bonding of the wires of windings 54 to themselves, assuring that windings 54 maintain the shape imparted by outer surface 58 of bobbin 52. The flats in windings 54, in combination with flats 64 of bobbin 52, provide mechanical locking of the windings to bobbin 52.

In an alternate embodiment of the present invention, windings 54 are composed of "bondable" wire. Bondable wire has a conductor covered with electrical insulation, then coated with a meltable adhesive, typically a thermoplastic. Widen the adhesive of bondable wire is heated, the adhesive melts, bonding the wire to adjacent surfaces. This heating melts the adhesive on the wire of windings 54. The adhesive thus bonds the wire of windings 54 to itself, fixing the geometry of windings 54. When so fixed, the effectiveness of the flats imparted in windings 54 by flats 64 in preventing relative motion between windings 54 and bobbin 52 is assured.

The assembly of first pole piece 20, second pole piece 40, and coil assembly 50 is illustrated in FIG. 2. Flats 60 of coil assembly 50 are aligned with flats 26 of first pole piece 20 and with flats 44 of second pole piece 40. First pole piece 20, second pole piece 40, coil assembly 50, and noise ring 54 are then assembled as shown in FIG. 2. The assembly of first pole piece 20, coil assembly 50, and second pole piece 40 can be by slip fit, press fit, or by a combination of both wherein the assembly is begun as a slip fit and finished by pressing first pole piece 20 and second pole piece 40 together. Claws 30 of first pole piece 20 and claws 46 of second pole piece 40 mesh in the final assembly, as is typical in a claw pole rotor. Flats 26 of first pole piece 20, flats 44 of second pole piece 40, and flats 60 of coil assembly 50 prevent rotation of coil assembly 50 relative to first pole piece 20 and second pole piece 40.

Various modifications and variations will no doubt occur to those skilled in the arts to which this invention pertains. Such variations which generally rely on the teachings through which this disclosure has advanced the art are properly considered within the scope of this invention.

What is claimed is:

1. A rotor for an electrical machine, said rotor comprising:

a pole piece, said pole piece being generally cylindrical with a center and having an axis of rotation perpendicular to said center of said pole piece, said pole piece further comprising a generally cylindrical hub concentric with said axis of rotation;

a bobbin, said bobbin being generally annular in shape and having an inner surface and an outer surface;

said inner surface having a diameter such that said bobbin can be placed concentrically over said hub; said outer surface comprising at least one flat portion; said bobbin located concentrically on said hub of said pole piece; and a coil, said coil comprising wire wound around said outer surface of said bobbin, whereby said coil has acquired at least one flat portion corresponding in number and location to said at least one flat portion on the outer surface of said bobbin.

2. A rotor as recited in claim 1, wherein:

said hub of said pole piece has an external surface, said external surface comprising at least one flat portion located on the external surface and running axially; and said inner surface of said bobbin comprises at least one flat portion located on the inner surface and running axially, said at least one flat portion being disposed such that said bobbin can be placed concentrically onto said hub, but only if said at least one flat portion of said hub and said at least one flat portion on the inner surface of said bobbin are aligned.

3. A rotor as recited in claim 2 wherein said pole piece is constructed of a single piece of metal.

4. A rotor as recited in claim 3 further comprising a second pole piece constructed of a single piece of metal, said second pole piece being generally cylindrical with a center and having an axis of rotation perpendicular to said center of said second pole piece; said second pole piece further comprising a generally cylindrical hub concentric with said axis of rotation; said hub having a diameter such that said hub can be inserted concentrically into said bobbin; said hub having an external surface; said external surface comprising at least one flat portion located on the external surface and running axially; said at least one flat portion disposed such that said hub of said second pole piece can be inserted concentrically into said bobbin, but only with said at least one flat portion of said hub in alignment with said at least one flat portion on the inner surface of said bobbin; said hub being located concentrically within said bobbin.

5. A rotor as recited in claim 4 wherein said coil is coated with adhesive.

6. A rotor as recited in claim 5 wherein said adhesive comprises varnish.

7. A rotor as recited in claim 4 wherein said wire of said coil is bondable wire, wherein said wire is bonded to itself in a plurality of places with adhesive from said bondable wire.

8. A rotor as recited in claim 4 wherein adhesive-impregnated tape is wrapped around the outside of said coil.

* * * * *